United States Patent [19]

Komaki

[11] Patent Number: 5,321,796
[45] Date of Patent: Jun. 14, 1994

[54] PRINTER DEVICE
[75] Inventor: Katsue Komaki, Tokyo, Japan
[73] Assignee: NEC Corporation, Tokyo, Japan
[21] Appl. No.: 993,855
[22] Filed: Dec. 21, 1992
[30] Foreign Application Priority Data
  Dec. 26, 1991 [JP] Japan .................. 3-358881
[51] Int. Cl.$^5$ .............................. G06F 15/00
[52] U.S. Cl. .................. 395/110; 395/115
[58] Field of Search ........... 395/110, 101, 115, 116, 395/150, 151; 346/154, 157; 340/735; 358/539; 345/141

[56] References Cited
U.S. PATENT DOCUMENTS
  3,471,848 10/1969 Manber .......................... 340/324
  4,907,282 3/1990 Daly et al. ........................ 395/110

Primary Examiner—Arthur G. Evans
Attorney, Agent, or Firm—Foley & Lardner

[57] ABSTRACT

A printer device includes a bit map memory for storing bit map data of one character, an intermediate data generator, an intermediate data storing area, a development unit, and a printer. The intermediate data generator generates intermediate data having information representing the presence/absence of an edge line of a character and positional information of the edge line every dot-scan line from outline data consisting of coordinate value data. The intermediate data storing area updates and stores the generated intermediate data every dot-scan line. The development unit sequentially develops bit map data in the bit map memory every dot-scan line on the basis of the stored intermediate data. The printer prints the character on the basis of the bit map data of one character developed and stored in the bit map memory.

8 Claims, 3 Drawing Sheets

PRINTER DEVICE

BACKGROUND OF THE INVENTION

The present invention relates to a printer device and, more particularly, to an outline font developing technique in the printer device.

As a method of developing an outline font, the following method is known. That is, outline font data of a character "I" shown in FIG. 2A is repetitively analyzed along an x-axis direction every dot-scan line, intermediate data having information representing the presence/absence of an edge line and information representing a position x of the edge line is formed by the analysis result to be stored. On the basis of the stored intermediate data, as shown in FIG. 2B, the character "I" is developed in a bit map memory.

In a conventional method of developing an outline font, as shown in FIG. 4, a one-character memory area for storing intermediate data for one character is assured (step S31), intermediate data obtained by sequentially analyzing outline font data along the x-axis direction every dot-scan line as described above are formed for all scan lines of one character (step S32), and the intermediate data are stored in the assured memory area.

Thereafter, on the basis of the intermediate data, for all the scan lines, which are stored in the memory area assured in advance in step S31, one character is developed and drawn in the bit map memory (step S33). Upon completion of drawing one character in the bit map memory, the assured memory area is released (step S34).

In the conventional method of developing an outline font, after all outline font data for one character are converted into intermediate data and stored, the character is drawn in a bit map memory. For this reason, a large amount of memory is required for developing the outline font.

In addition, since a memory amount required for developing the outline font is increased proportionally to the number of scan lines, i.e., the size of a character, the memory amount is not disadvantageously constant.

SUMMARY OF THE INVENTION

It is an object of the present invention to provide a printer device capable of reducing a memory amount for intermediate data used for developing an outline font.

It is another object of the present invention to provide a printer device capable of causing a memory amount to be constant independently of the size of a character.

In order to achieve the above objects, according to the present invention, there is provided a printer device comprising a bit map memory for storing bit map data of one character, intermediate data generating means for generating intermediate data having information representing the presence/absence of an edge line of a character and positional information of the edge line every dot-scan line from outline data consisting of coordinate value data, intermediate data storing means for updating and storing the generated intermediate data every dot-scan line, development means for sequentially developing bit map data in the bit map memory every dot-scan line on the basis of the stored intermediate data, and printing means for printing the character on the basis of the bit map data of one character developed and stored in the bit map memory.

DESCRIPTION OF THE PREFERRED EMBODIMENT

An embodiment of the present invention will be described below with reference to the accompanying drawings.

Figure 1:
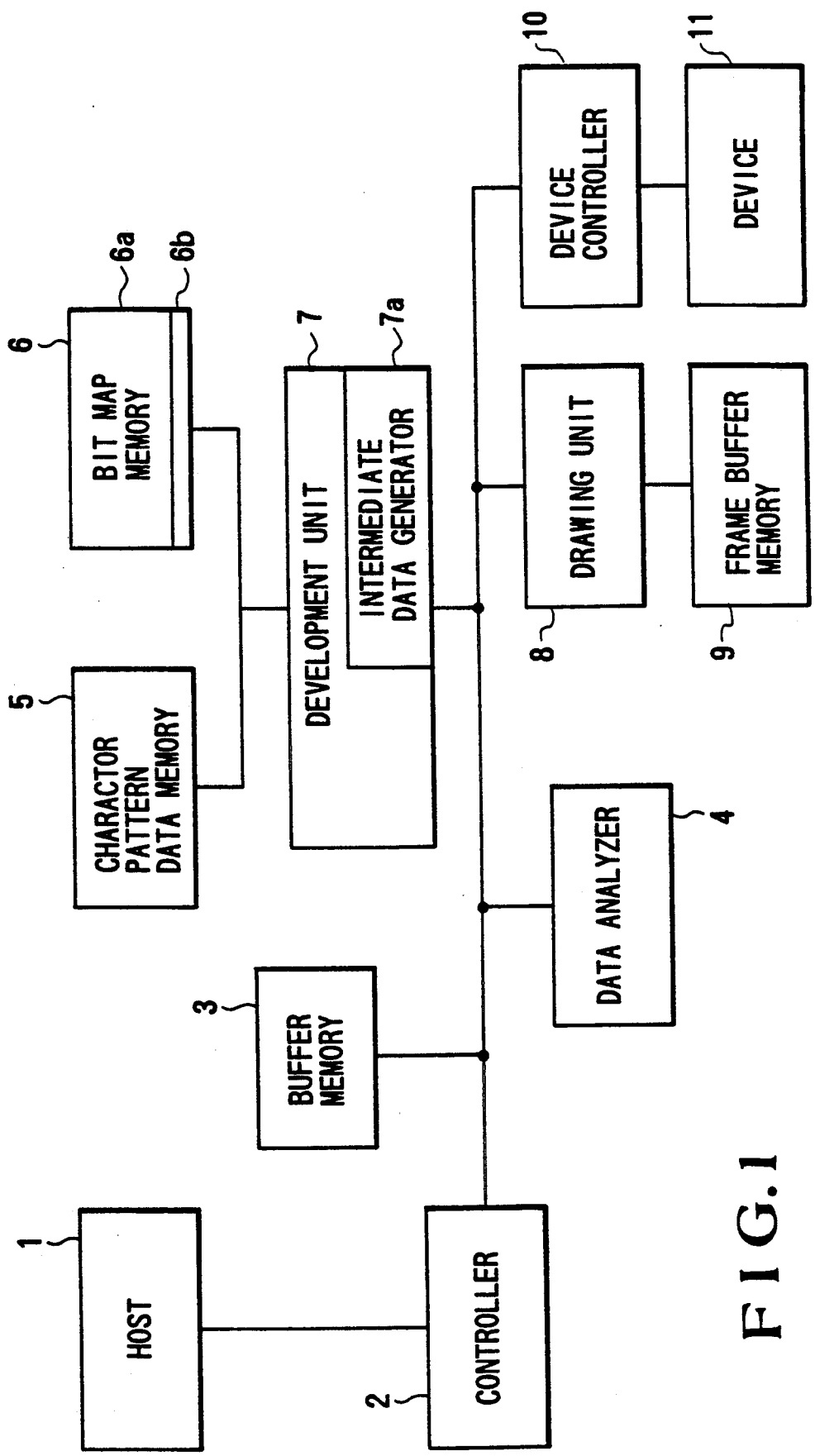
FIG. 1 is a block diagram showing an arrangement of a printer device according to an embodiment of the present invention.

FIG. 1 shows the arrangement of a printer device according to the embodiment of the present invention. In FIG. 1, when a controller 2 of a printer device receives print data from a host 1, the controller 2 temporarily stores the print data in a buffer memory 3. At this time, the buffer memory 3 is a memory for temporarily storing the control or character codes of the printer device.

A data analyzer 4 reads and analyzes the print data stored in the buffer memory 3. When the print data read out from the buffer memory 3 is determined as character data on the basis of the analysis result, the data analyzer 4 outputs the character data to a development unit 7.

The development unit 7 checks whether the character data sent from the data analyzer 4 is bit map data consisting of dot data in advance or outline font data consisting of coordinate value data.

When the development unit 7 determines that the character data from the data analyzer 4 is the bit map data, the development unit 7 directly draws the character data in a bit map memory 6 with reference to character pattern data stored in a character pattern data memory 5.

In addition, when the development unit 7 determines that the character data from the data analyzer 4 is the outline font data, the development unit 7 develops the character data to the bit map data with reference to the character pattern data stored in the character pattern data memory 5, and then draws the character data in the bit map memory 6. The development unit 7 comprises an intermediate data generator 7a for generating intermediate data used for developing character data into bit map data.

The bit map memory 6 comprises an area 6a for storing bit map data of one character and a supplementary area 6b used for developing outline font data in the area 6a.

A picture drawing unit 8 draws the character data in a frame buffer memory 9 on the basis of the print data output from the data analyzer 4. When the character data is to be drawn, the picture drawing unit 8 drives the development unit 7 to read out the character data from the bit map memory 6, and the character data is drawn in the frame buffer memory 9. In this case, the frame buffer memory 9 is a memory for storing bit map data of one print page.

When the data analyzer 4 receives a print start command, it starts the operation of a device controller 10.

When the device controller 10 is driven by the data analyzer 4, the device controller 10 sends a read command of the frame buffer memory 9 to the picture drawing unit 8, and sends a print start command to a device 11. The device 11 actually prints the data of the frame buffer memory 9 on a sheet in response to the print start command.

Figure 2A:
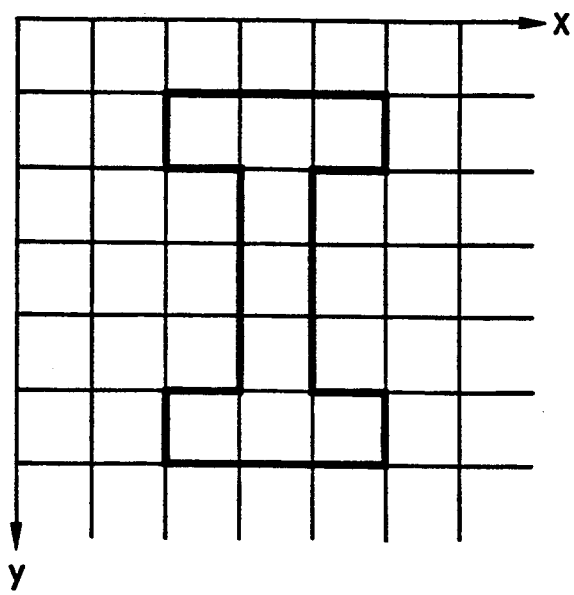
FIGS. 2A and 2B are views showing a developed outline font.
Figure 2B:
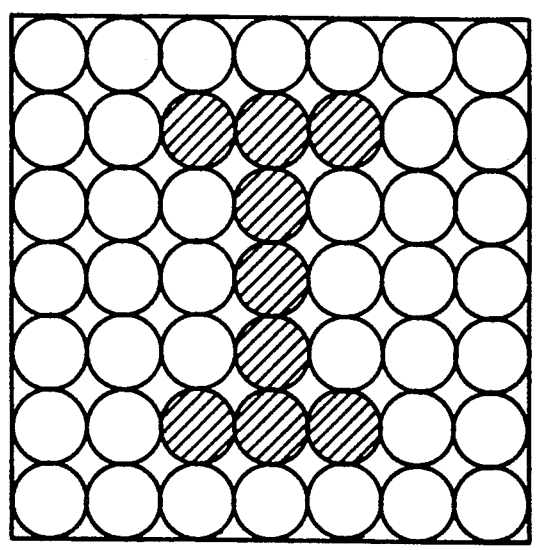

FIGS. 2A and 2B show a developed outline font. FIG. 2A shows an outline font of a character "I", and FIG. 2B shows bit map data of the character "I".

Figure 3:
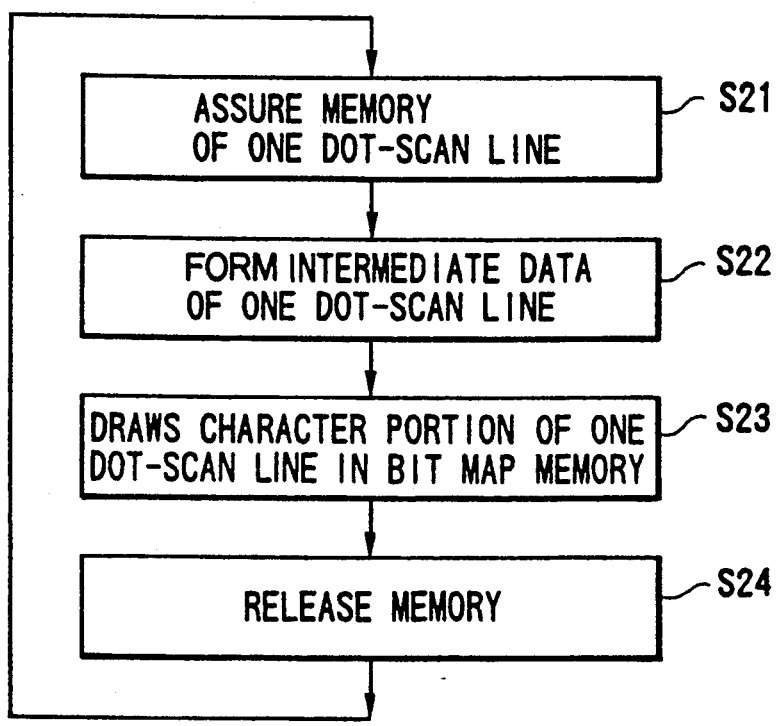
FIG. 3 is a flow chart showing an operation of the printer device in FIG. 1.
Figure 4:
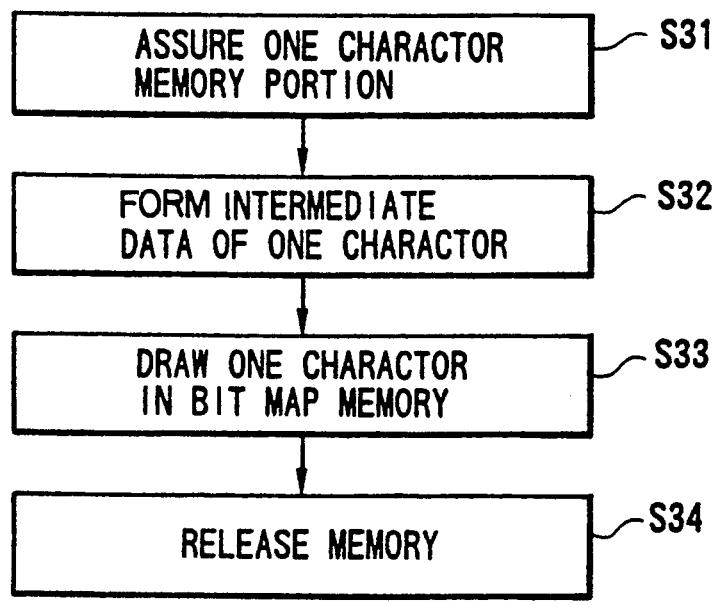
FIG. 4 is a flow chart showing an operation of a conventional printer.

FIG. 3 shows a flow chart of an operation of the printer device according to the embodiment of the present invention. The operation of the printer device according to the embodiment of the present invention will be described below with reference to FIGS. 1 to 3.

As shown in FIG. 2A, the outline font of the character "I" has the edge of the character "I" as coordinate value data. In FIG. 1, when the intermediate data generator 7a of the development unit 7 receives the outline font character "I", it reads out outline font data (coordinate value data) from the character pattern data memory 5 and analyzes the outline font data along an x-axis direction every dot-scan line. Thereafter, on the basis of the analysis result, the intermediate data generator 7a generates intermediate data having information representing the presence/absence of the edge line of the character on scan lines and information representing a position x of the edge line. The intermediate data is stored in the supplementary area 6b of the bit map memory 6. The development unit 7 converts the stored intermediate data into bit map data represented by white and black dots shown in FIG. 2B, and then develops the bit map data in the area 6a of the bit map memory 6.

That is, in FIG. 3, when the development unit 7 determines that the character data "I" from the data analyzer 4 is outline font data, the supplementary area 6b of the bit map memory 6 is assured as a memory area for storing intermediate data of one dot-scan line first (step S21).

The development unit 7 causes the intermediate data generator 7a to analyze the outline font data along the x-axis direction and to form intermediate data of one dot-scan line, and the intermediate data of the one dot-scan line is stored in the assured supplementary area 6b.

Thereafter, the development unit 7 develops and draws a character portion of one dot-scan line in the area 6a of the bit map memory 6 on the basis of the intermediate data of one dot-scan line stored in the supplementary area 6b (step S23). Upon completion of drawing of the character portion of one dot-scan line in the area 6a, the assured supplementary area 6b is released (step S24).

When the development unit 7 repetitively performs the operations in steps S21 to S24 to all the scan lines of the outline font data of the character "I", the development unit 7 develops the bit map data of one character (character "I") in the bit map memory 6.

In this manner, when the development unit 7 determines character data as outline font data, the development unit 7 forms the intermediate data of one dot-scan line from the outline font data, stores the intermediate data in the supplementary area 6b of the bit map memory 6, and develops bit map data in the area 6a of the bit map memory 6 every dot-scan line on the basis of the intermediate data stored in the supplementary area 6b, thereby reducing a memory amount required for storing the intermediate data. In addition, even when a character size is increased, the memory amount can be kept constant. Therefore, the memory amount used for developing an outline font can be reduced, and the memory amount can be kept constant.

In the embodiment of the present invention, although the supplementary area 6b for storing intermediate data is assured in the bit map memory 6, the supplementary area 6b may be formed outside the bit map memory 6. The present invention is not limited to the embodiment.

As has been described above, according to the present invention, intermediate data is generated from outline data consisting of coordinate value data every dot-scan line and stored, and bit map data is developed in a bit map memory every dot-scan line on the basis of the stored intermediate data, thereby reducing a memory amount required for storing the intermediate data used for developing an outline font. In addition, the memory amount can be kept constant.

What is claimed is:

1. A printer device comprising:
    a bit map memory for storing bit map data of one character, the bit map data being represented by white and black dots for printing;
    intermediate data generating means for generating intermediate data having information representing the presence/absence of an edge line of a character and positional information of the edge line every dot-scan line from outline data including coordinate value data;
    intermediate data storing means, having a memory area for storing the intermediate data of one dot-scan line only, for updating and storing the intermediate data from said intermediate data generating means every dot-scan line;
    development means for sequentially developing and storing the bit map data in the bit map memory every dot-scan line on the basis of the intermediate data stored in said intermediate data storing means; and
    printing means for printing the character on the basis of the bit map data of one character developed and stored in said bit map memory.

2. A device according to claim 1, further comprising a character pattern data memory for storing character pattern data, and wherein said intermediate data generating means reads out the outline data from said character pattern data memory on the basis of input outline font data, and analyzes the outline data every dot-scan line to generate the intermediate data.

3. A device according to claim 1, wherein the memory area of said intermediate storing means is formed in said bit map memory.

4. A device according to claim 3, wherein said intermediate generating means temporally assures the memory area of said intermediate data storing means in said bit map memory when input character data is outline font data.

5. A device according to claim 4, wherein the memory area of said intermediate data storing means assured in said bit map memory is released upon completion of developing and storing the intermediate data of one dot-scan line from said intermediate data generating means in said bit map memory.

6. A method for generating bit map data for a printer device, comprising the steps of:
    storing bit map data of one character in a bit map memory, the bit map data being represented by white and black dots for printing;

generating intermediate data having information representing the presence/absence of an edge line of a character and positional information of the edge line every dot-scan line from outline data including coordinate value data;

updating and storing the intermediate data of each one dot-scan line, into a memory area for storing the intermediate data of one dot-scan line only;

sequentially developing and storing the bit map data in the bit map memory every dot-scan line on the basis of the intermediate data stored in said memory area for storing the intermediate data;

printing the character on the basis of the bit map data of one character developed and stored in said bit map memory.

7. The method as recited in claim 6 further comprising the step of temporarily reserving the memory area for storing the intermediate data when input character data is outline font data.

8. The method as recited in claim 7 further comprising the step of releasing the reserved memory area for storing the intermediate data upon completion of developing and storing the intermediate data of one dot-scan line in said bit map memory.

* * * * *